United States Patent [19]

Dessel

[11] 4,280,432
[45] Jul. 28, 1981

[54] QUICK-RELEASE FITTING FOR A SAILBOAT STAY

[76] Inventor: Thomas F. Dessel, 2015 Studebaker Rd., Long Beach, Calif. 90815

[21] Appl. No.: 34,687

[22] Filed: Apr. 30, 1979

[51] Int. Cl.³ .............................................. B63H 9/04
[52] U.S. Cl. .................................. 114/109; 254/258; 24/71 CT
[58] Field of Search ............... 114/108, 109, 205, 213, 114/215, 216, 217, 223; 254/62, 63, 77, 78, 79, 80, 81

[56] References Cited

U.S. PATENT DOCUMENTS

| | | | |
|---|---|---|---|
| 1,235,762 | 8/1917 | Boes | 254/78 |
| 2,564,821 | 8/1951 | Smith | 254/78 |
| 3,418,008 | 12/1968 | Durbin | 254/78 |
| 3,866,559 | 2/1975 | Joensen | 114/217 |

Primary Examiner—Trygve M. Blix
Assistant Examiner—Jesus D. Sotelo
Attorney, Agent, or Firm—Fulwider, Patton, Rieber, Lee & Utecht

[57] ABSTRACT

A quick-release fitting for tensioning and untensioning a sailboat stay that extends between the hull and a mast of the sailboat. Upper and lower barrels are connected together by a release lever that is held in place by a quick-release pin. When the pin is removed, the lever pivots away from its normal position away from the upper barrel to increase the spacing between the barrels and untension the sailboat stay.

6 Claims, 6 Drawing Figures

U.S. Patent  Jul. 28, 1981  4,280,432
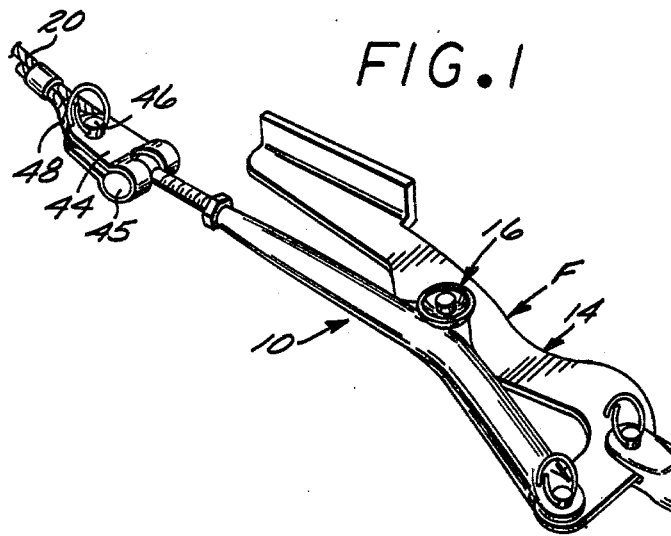
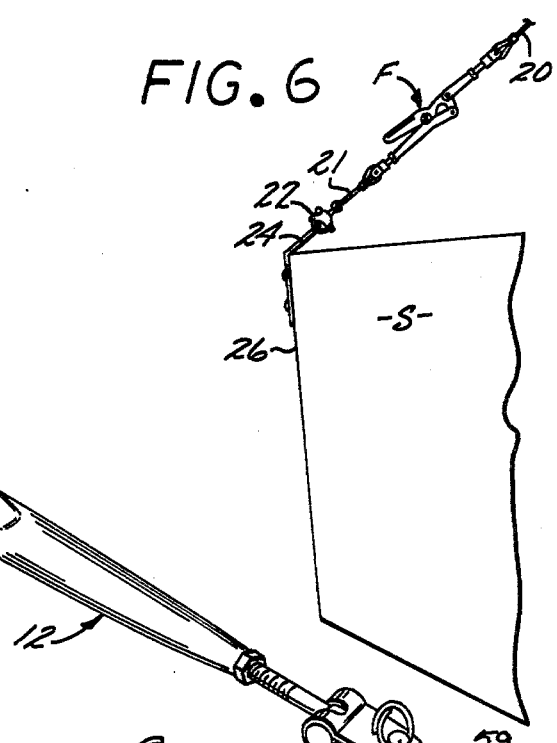
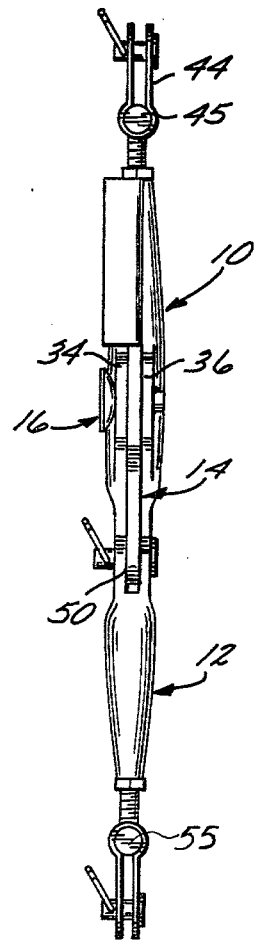
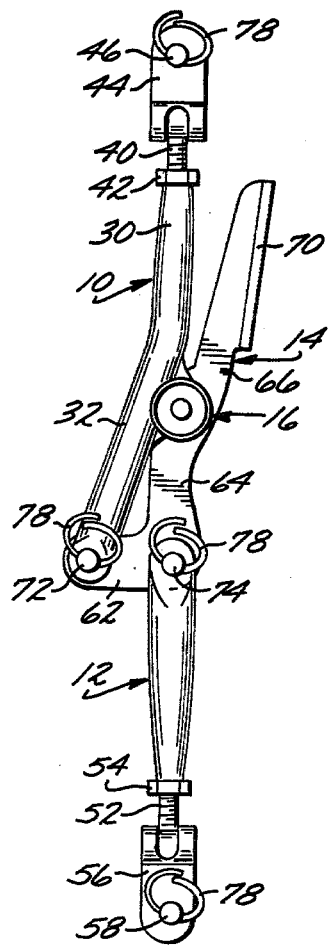
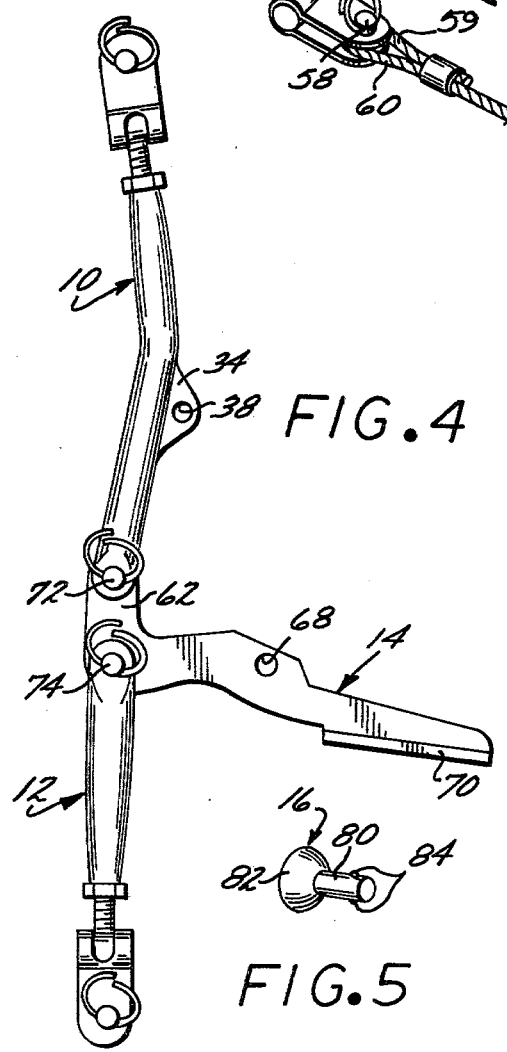

4,280,432

QUICK-RELEASE FITTING FOR A SAILBOAT STAY

BACKGROUND OF THE INVENTION

Various fittings have been heretofore proposed for tensioning and untensioning a sailboat stay, particularly a backstay. It is desirable to untension a backstay when a smaller type sailboat is to be hoisted out of the water onto a trailer or cradle. Additionally when sailing off the wind, it is desirable to untension the backstay so as to increase the efficiency of the sails while running. When the sail boat again heads towards the wind, it is essential that the backstay be retensioned quickly. Heretofore proposed quick-release fittings for sailboat stays have generally been bulky and heavy, both features being most undesirable in a sailboat fitting, especially where the sailboat is of the racing type.

SUMMARY OF THE INVENTION

It is a major object of the present invention to provide a quick-release fitting for tensioning and untensioning a sailboat stay which is light in weight and of compact design.

Another object of the present invention is to provide a quick-release fitting of the aforedescribed nature which is easy and quick to operate.

Yet another object of the present invention is to provide a quick-release fitting of the aforedescribed nature which is full-proof and safe in operation.

A further object of the present invention is to provide a quick-release fitting of the aforedescribed nature which may incorporate conventional turnbuckles.

Other objects and advantages of the present invention will become apparent from the following detailed description when taken in conjunction with the appended drawings.

BRIEF DESCRIPTION OF THE DRAWINGS

FIG. 1 is perspective view of a preferred form of a quick-release fitting embodying the present invention.

FIG. 2 is a rear elevational view of said fitting.

FIG. 3 is a side elevational view of said fitting, with its parts arranged in their normal positions.

FIG. 4 is a side elevational view similar to FIG. 3 but showing the parts of said fitting arranged in a position to untension a sailboat stay.

FIG. 5 is perspective view showing a release pin utilized in the fitting of FIGS. 1 through 4; and FIG. 6 is a broken side elevational view in reduced scale, showing one arrangement for installing said quick-release fitting on a sailboat.

DESCRIPTION OF A PREFERRED EMBODIMENT

Referring to the drawings, a preferred form of quick-release fitting F embodying the present invention includes an upper barrel generally designated 10, a lower barrel generally designated 12, and a release lever generally designated 14. A quick-release pin generally designated 16 is interposed between the upper barrel 10 and release lever 14 to normally maintain the upper and lower barrels in an in-line alignment as shown in FIGS. 1, 2, 3 and 6. Removal of the quick-release pin 16 permits the quick-release lever 14 to be pivoted to a second position shown in FIG. 4, wherein the upper and lower barrels are displaced longitudinally from their initial position. As shown in FIG. 6, the upper end of upper barrel 10 is affixed to the lower end of a sailboat backstay 20, while the lower end of lower barrel 12 is anchored relative to the hull of a sailboat S by means of a pennant 21 attached at its lower end to a snap shackle 22 engaged with a chain plate, or the like, 24. Such chain plate is rigidly affixed to the transom 26 of sailboat S.

More particularly, referring particularly to FIG. 3, the upper part 30 of upper barrel 10, normally extends vertically, with the lower part 32 thereof extending downwardly and forwardly. The rear, upper portion of lower part 32 has bifurcations 34 and 36 formed with a pair of transversely aligned release pin-receiving bores 38. The upper end of upper barrel 10 is provided with a conventional T-headed turnbuckle bolt 40 and a complimentary lock nut 42 that engages the upper end of upper barrel 10. A conventional U-shaped clevis 44 is rotably carried by the T-head 45 of turnbuckle bolt 40. The upper end of clevis 44 is provided with a removable pin 46 for engagement with a loop 48 formed in the lower end of backstay 20, as shown particularly in FIG. 1.

Lower barrel 12 is of straight configuration and is formed at its upper end with bifurcated jaws 50. The lower end of lower barrel 12 threadably carries a conventional downwardly extending turnbuckle bolt 52, with a complimentary lock nut 54 engaging the lower end of lower barrel 12. The lower end of turnbuckle bolt 52 is formed with a T-head 55 that rotatably carries the upper end of a lower U-shaped clevis 56 in a conventional manner. The clevis 56 is provided with a removable pin 58, which as indicated in FIG. 1 permits the clevis to receive and retain loop 59 formed on the upper portion of pennant 21.

Release lever 14 is of integral construction and has a forwardly off-set lower portion 62 which merges at its rear end into a vertical portion 64. The upper end of the vertical portion 64 merges into an upwardly and rearwardly extending portion 66. The lower front part of lever portion 66 is formed with a transversely extending release pin-receiving bore 68 that is normally aligned with the bores 38 of upper barrel 10 so as to receive the quick-release pin 16. A handle 70 is formed on the upper part of release lever 14. The front end of off-set lower portion 62 of lever 14 is pivotally connected to the lower end of upper barrel 10 by a first pivot pin 72. A second pivot pin 74 connects the rear part of off-set lower portion 62 of the lever to the upper end of lower barrel 12. All of the aforedescribed pins 46, 58, 72 and 74 are retained in place by split rings 78 in a conventional manner.

Referring now to FIG. 5, the quick-release pin 16 is of conventional construction, having a horizontal shank 80 formed at one end with a head 82. The free end of the shank 80 is provided with a pair of spring pressed detents 84 which temporarily retract against spring force as the shank 80 is forced through the aligned bores 38 and 68 of the upper barrel and release lever, respectively. Other types of quick-release pins may be employed.

In the operation of the aforedescribed quick-release fitting, when the quick-release pin 16 is disposed in its normal position wherein shank 80 extends through aligned bores 38 and 68, the parts of the quick-release lever will be arranged as shown in FIGS. 1, 2, 3 and 6, wherein lower barrel 12 is in vertical alignment with the upper part 30 of upper barrel 10. At this time, the backstay 20 will be maintained in its tensioned condition. In order to untension backstay 20, quick-release pin 16 is merely retracted from normally aligned bores 38 and 68. Lever 14 will then be pivoted clockwise from its position of FIG. 3 to its position of FIG. 4. In such position, lower portion 62 of release lever 14 extends generally vertically so as to be substantially longitudinally aligned with the upper and lower barrels 10 and 12 respectively, to thereby increase the distance between the upper and lower ends of the barrels and their associated clevises 44 and 56. This will serve to untension the backstay 20. To again tension such backstay, it is only necessary to pivot lever 14 counter clockwise from its position in FIG. 4 to its normal position in FIG. 3, and reinsert quick-release pin 16 through the now-aligned bores 38 and 68.

It should be noted that although the quick-release lever of the present invention has been described in conjunction with the backstay of a sailboat, such fitting may be utilized with other sailboat rigging, i.e. stays, shrouds, or other cables. Because of the in-line configuration of the quick-release fitting of the present invention the size and weight thereof may be kept to a minimum without sacrificing strength. The incorporation of turnbuckle adjustment in such fitting eliminates the necessity of providing separate turnbuckles.

Various modifications and changes may be made with respect to the foregoing detailed description without departing from the spirit of the present invention.

I claim:

1. A quick-release fitting for tensioning and untensioning a sailboat stay or the like, that extends between the hull and a mast of the boat, said quick-release fitting comprising:

an upper barrel member having its upper end affixed to the lower end of the sailboat stay, the upper part of the upper barrel normally extending vertically and the lower part thereof extending downwardly and forwardly, and with the rear portion of the lower part having bifurcations formed with a pair of transversely aligned release pin-receiving bores;

a straight lower barrel having its lower end anchored relative to the hull of the sailboat, said lower barrel normally being vertically aligned with the upper part of said upper barrel;

a release lever having a forwardly off-set lower portion, the rear end of which merges into a vertically extending portion, the upper of the vertically extending portion merging into an upwardly and rearwardly extending portion with the lower front part of the latter being formed with a release pin-receiving bore that is normally aligned with the release pin-receiving bores of the upper barrel;

a first pivot pin connecting the front end of the off-set portion of said release lever and the lower end of the upper barrel;

a second pivot pin connecting the rear end of the release lever off-set portion and the upper end of the lower barrel; and a readily disengagable quick-release pin normally extended through the aligned release pin-receiving bores to retain the parts of the fitting in their normal position wherein said stay is maintained tensioned, with removal of the quick-release pin from said aligned bores permitting the release lever to be pivoted to a rearwardly extending position wherein the off-set portion of said release lever is longitudinally aligned with the upper and lower barrels to thereby increase the distance between the upper and lower ends of the barrels and untension the sailboat stay.

2. A quick-release fitting as set forth in claim 1, wherein a handle is formed on the upwardly and rearwardly extending portion of the release lever.

3. A quick-release fitting as set forth in claim 1, wherein the release pin includes a head and a shank with the free end of such shank having spring pressed detent means.

4. A quick-release fitting as set forth in claim 1, wherein said upper and lower barrels include vertically extending turnbuckle means for adjusting the tension of said stay.

5. A quick-release fitting as set forth in claim 2, wherein said upper and lower barrels include vertically extending turnbuckle means for adjusting the tension of said stay.

6. A quick-release fitting as set forth in claim 3, wherein said upper and lower barrels include vertically extending turnbuckle means for adjusting the tension of said stay.

* * * * *